(12) United States Patent
Donak et al.

(10) Patent No.: US 6,330,316 B1
(45) Date of Patent: Dec. 11, 2001

(54) ALTERNATE ROUTING SCHEMES USING QUALITY OF SERVICE INFORMATION FOR CALLS INVOLVING UNRELIABLE NETWORKS

(75) Inventors: John R. Donak, Kanata; Frank P. Meijer; Christopher R. Solar, both of Ottawa, all of (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/266,998

(22) Filed: Mar. 12, 1999

(51) Int. Cl.[7] .............................. H04M 3/42; H04M 3/00; H04L 12/28; H04L 12/16; H04L 1/00
(52) U.S. Cl. .............. 379/196; 379/201.01; 379/265.01; 370/351; 370/260; 370/236
(58) Field of Search .................................. 370/351, 260, 370/54, 236; 379/201, 265

(56) References Cited

U.S. PATENT DOCUMENTS

| | | | |
|---|---|---|---|
| 5,446,730 | * 8/1995 | Lee et al. | 370/4 |
| 5,825,869 | * 10/1998 | Brooks et al. | 379/265 |
| 5,892,754 | * 4/1999 | Kompella et al. | 370/236 |
| 5,903,558 | * 5/1999 | Jones et al. | 370/351 |
| 5,995,490 | * 11/1999 | Shaffer et al. | 370/260 |
| 5,995,606 | * 11/1999 | Civanlar et al. | 379/201 |

* cited by examiner

*Primary Examiner*—Ahmad Matar
*Assistant Examiner*—Thjuan P Knowlin
(74) *Attorney, Agent, or Firm*—Cobrin & Gittes

(57) ABSTRACT

The invention relates to methods and apparatus for determining whether a CPS should employ a standard interface or an unreliable network for routing telephone calls. The invention includes a telephone call switching apparatus which includes a routing engine configured to receive a telephone call from a terminal connected to the call switching apparatus and a switching matrix connected thereto. The telephone call includes a destination code. The routing engine is configured to receive the telephone call from a terminal or trunk line, determine an unreliable network route for the telephone call based upon the destination code, and provide a message to a call manager associated with the unreliable network route (via the switching matrix). The message includes the destination code. The routing engine is also configured to receive a response from the call manager; and route the call over the unreliable route if the response is affirmative.

20 Claims, 1 Drawing Sheet

ALTERNATE ROUTING SCHEMES USING QUALITY OF SERVICE INFORMATION FOR CALLS INVOLVING UNRELIABLE NETWORKS

FIELD OF THE INVENTION

The present invention relates generally to customer premise switching equipment and more particularly to customer premise switching equipment with the ability to route calls over unreliable networks such as the Internet and to select an alternate route for a telephone call intended for the unreliable network when the quality of service of the unreliable network falls below a predetermined threshold.

BACKGROUND OF THE INVENTION

Support for end-to-end voice calls using Internet Protocol ("IP") networks such as the Internet as an alternative to traditional public switched telephone networks ("PSTN") is well known. Unlike the PSTN, which is circuit-switched, the Internet is packet-switched; communication on the Internet is accomplished by transmitting and receiving packets of data. In addition to data, each packet contains a destination address to ensure that it is routed correctly. The format of these packets is defined by the IP. One type of allowable data is encoded, digitized voice, termed voice over IP (VoIP). VoIP is voice that is packetized as defined by IP, and communicated over the Internet for telephone-like communication. Individual VoIP packets may travel over different network paths to reach the final destination where the packets are reassembled in correct sequence to reconstruct the voice information.

While transmission over the Internet is inexpensive relative to transmission over the PSTN, the Internet poses problems which are not present in the PSTN. In particular, the transmission speed between any two users can change drastically due to the dynamic number of users sharing the common transmission medium, their bandwidth requirements, the capacity of the transmission medium, and the efficiency of the network routing and design. Other problems associated with VoIP are the variability of the quality of the signal received at the destination (i.e. the number of transmission errors such as packet loss, packet delay, corrupted packets, etc.). Thus, while the Internet may be a suitable medium for voice communications the suitability is not consistent.

Many businesses employ customer premise switches ("CPS")(e.g. Key Signaling Units ("KSU"), Private Branch Exchanges ("PBX"), Centrexes or the like) for routing calls, inter alia, from the business equipment to destination telephone equipment. When an end-user makes a call, the digits dialed are parsed based upon pre-configured tables which indicate which communication interfaces are to be employed for the call attempt (i.e. PSTN, Internet, other IP networks, etc.). The choice of which route to take may be based upon cost or quality of the connection or other well known attributes. In addition to routing calls through the PSTN, many of these CPS route calls through unreliable networks such as the Internet, Frame Relays and the like.

Systems currently exist which monitor the quality of service (QoS) of an unreliable network to determine if an alternate communication path should be chosen. However, such systems either disable the gateway to the network when the QoS falls below a predetermined threshold, the call manager associated with the network routes the call back to the routing engine to be rerouted therefrom or the call manager routes the call to an alternate network.

Disabling the gateway entirely is illogical since the QoS of the network is specific to a destination. Thus while the QoS of the network with regard to one destination may not be acceptable, the QoS of the network with regard to other destinations may be acceptable. Thus, disabling the entire gateway shuts off a relatively inexpensive route for all calls when only a single destination may be unusable. With regard to either routing the call from the call manager back to the routing engine or routing the call from the call manager to another network, this wastes valuable resources (e.g. communication channels, etc.).

Accordingly, there exists a need for a customer premise switch ("CPS"), having access to an unreliable network for routing calls, which can determine the QoS of the unreliable network for a particular call prior to routing the call to the call manager for that network.

Accordingly, it is an object of this invention to provide a CPS, having access to an unreliable network for routing calls, which can determine the QoS of the unreliable network for a particular call prior to routing the call to the call manager for that network.

This and other objects of the invention will become apparent to those skilled in the art from the following description thereof.

SUMMARY OF THE INVENTION

In accordance with the teachings of the present invention, this and other objects may be accomplished by the present invention, which provides methods and apparatus for determining whether a CPS should employ a standard telephone interface or an unreliable network for routing telephone calls.

An embodiment of the invention includes a telephone call switching apparatus. The switching apparatus includes a memory for storing a routing table and a routing engine connected to the memory. The routing engine is configured to receive a telephone call including a destination code. It is also configured to determine an unreliable network route for the telephone call from the routing table, based upon said destination code. It is configured to provide a message, including the destination code, for receipt by a call manager associated with the unreliable network route. The routing engine is also configured to receive a response from the call manager; and route the call over the unreliable network route if the response indicates that a QoS of the unreliable network is sufficient for routing the telephone call.

Another embodiment of the invention includes a method of routing telephone calls. The method includes a routing engine receiving a telephone call including a destination code. The routing engine determines a route for the telephone call which includes an unreliable network. The routing engine sends a message, which includes the destination code, for receipt by a call manager associated with the unreliable network and routes the telephone call over the unreliable network if the routing engine receives an acknowledgment to the message.

Still another embodiment of the invention includes a telephone call switching apparatus. The telephone switching apparatus includes a receiving module for receiving a telephone call from a terminal. The telephone call includes a destination code. The apparatus further includes a module for determining a route for the telephone call which is connected to the module for receiving. The route includes an unreliable network. The apparatus also includes a module for determining if a quality of service of the unreliable network is sufficient for routing the telephone call over the unreliable network. The module for determining a route, routes the telephone call over the unreliable network if the module for determining if a quality of service is sufficient determines that the quality of service is sufficient and communicates this determination to the module for determining a route.

DESCRIPTION OF THE DRAWINGS

The invention will be more clearly understood by reference to the following detailed description of an exemplary embodiment in conjunction with the accompanying drawings, in which.

DETAILED DESCRIPTION OF THE INVENTION

Figure 1:
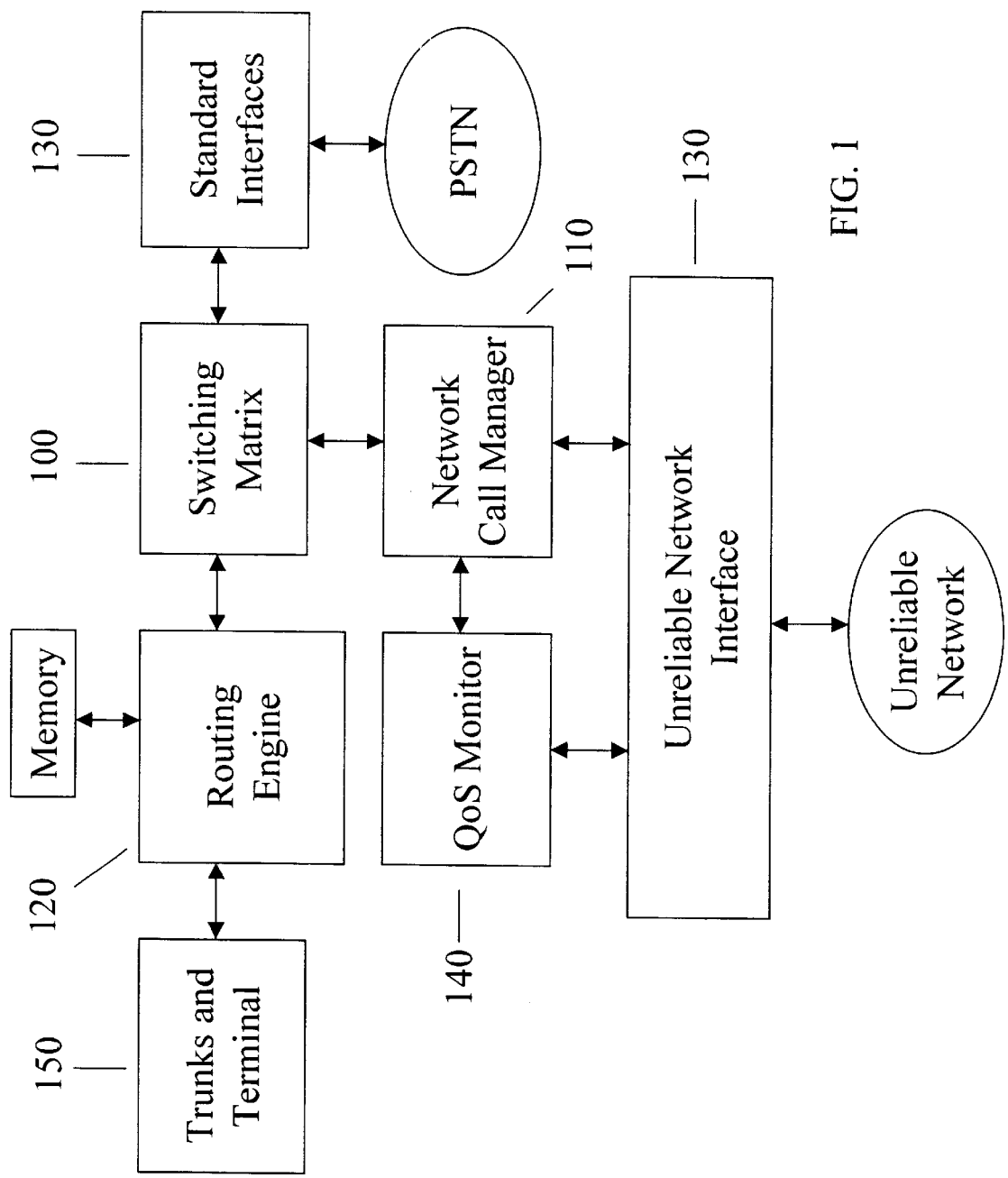
FIG. 1 is a block diagram of an embodiment of the invention.

The present invention provides a method and apparatus for determining whether a CPS should employ a standard interface (e.g. for the PSTN), or an unreliable network (e.g. for the Internet, another IP network, some other packet-switched network, a frame relay, etc) for routing telephone calls.

FIG. 1 illustrates an embodiment of the present invention. Terminals and trunk lines 150 are connected to the CPS (e.g. a PBX, Centrex, KSU or the like). Hereafter, any reference to trunk lines 150 or terminals 150 is intended to refer to either or both. The terminals and/or the trunk lines 150 can make and receive telephone calls. The CPS includes a routing engine 120 connected to a switching matrix 100. Routing engine 120 supports alternate routing through the use of primary and secondary tables. Least cost routing is a form of alternate routing which can be realized through the use of these tables. The routing engine 120 may be connected through switching matrix 100 to various interfaces (e.g. standard interfaces for connecting to the PSTN, etc) for connecting to various networks. One such interface may include a call manager 110 for connecting the call to the unreliable network (e.g. the Internet, some other IP network, a frame relay, or some other network capable of carrying voice which has variable QoS). The call manager 110 may be an adjunct to the CPS or it may be integral therewith. The call manager 110 includes a QoS monitor 140 which may be integral therewith or an adjunct thereto.

In operation, the routing engine 120 receives a telephone call, including a destination code from a terminal or trunk line 150. Based upon the destination code, the routing engine 120 determines the primary interface choice 130 for the call. This choice could be based upon conventional least cost routing techniques or it could be based upon a quality of service requirement or any other conventional attribute used to determine a primary routing choice. If the primary choice is determined to be an unreliable network then the routing engine 120 sends a message to the call manager 110 to determine if the QoS of the unreliable network is sufficient for the current telephone call. The message includes the destination code and the QoS requirements of the call. Those skilled in the art will recognize that the message does not need to include the QoS requirement if a general QoS minimum requirement is set for all telephone calls (e.g. an earlier message could inform the QoS monitor 140 of the QoS requirements, the QoS monitor 140 could be configured into the QoS monitor, or it could be configured into the call manager 110, etc.). In a configuration where a message is employed to inform the QoS monitor 140 of the general QoS requirements, the QoS requirement may only need to be sent one time to the QoS Monitor 140. The call manager 110 queries the QoS monitor 140 for the current QoS of the network based upon the destination code. The call manager 110 compares the QoS requirements to the actual QoS received from the QoS monitor 140. If the actual QoS is sufficient (e.g. the same as the QoS requirements, better than the QoS requirements, or within some predetermined acceptable range) then the call manager 110 sends an acknowledgment ("ACK") response back to the routing engine 120. If the actual QoS is determined to be insufficient, then the call manager 110 communicates a negative acknowledgment ("NACK") response back to the routing engine 120. If the routing engine 120 receives an ACK, it can route the call to the call manager 110 and over the unreliable network. If, however, the routing engine 120 receives a NACK, it can choose an alternate network through which to route the call. If an alternate network is chosen, the CPS may indicate the same to the terminal or trunk line 150.

It is considered within the scope of the present invention that the routing engine 120 could set a timer when it sends the message to the call manager 110. Thus, if the call manager 110 does not respond to the routing engine 120 within a predetermined period of time, the routing engine 120 could route the call to an alternate network. This timer could be used in conjunction with or instead of the NACK. It is also considered within the scope of the present invention that the call manager 110 could simply forward the QoS information received from the QoS monitor 140. In this configuration, the routing engine 120 could compare the QoS requirement and the actual QoS and make the determination whether to route the call over the unreliable network or to select an alternate network. It is also considered within the scope of the present invention that the comparison of QoS requirement to the actual QoS is performed in the QoS monitor 140 and that the QoS monitor 140 sends the ACK or NACK which the call manager 110 simply forwards to the routing engine 120.

While the present invention has been described in relation to only a primary and secondary routing choice, it is possible for additional choices to be programmed into the CPS. In a configuration which includes additional routing choices after the secondary choice, it is possible for the unreliable network to be a secondary choice or a choice which is further down the list. It is also possible that instead of deciding to route the call to an alternate network, the routing engine 120 could be configured to inform the calling party that there is no available network for routing the call.

It will thus be seen that the invention efficiently attains the objects set forth above, among those made apparent from the preceding description. In particular, the invention provides methods and apparatus for monitoring a QoS of an unreliable network based upon a destination thereon, determining if the monitored QoS is sufficient for a particular telephone call and providing this information to the routing engine of the switch to assist it in its determination of how to route the particular call. Those skilled in the art will appreciate that the configuration depicted in FIG. 1 performs these functions without wasting system resources.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. A telephone call switching apparatus comprising:
    a memory for storing a routing table;
    a routing engine coupled to said memory and configured to:
        receive a telephone call including a destination code,
        determine an unreliable network route for said telephone call from said routing table based upon said destination code;
        provide a message for receipt by a call manager associated with said unreliable network route, said message including said destination code;
        receive a response from said call manager; and
        route said call over said unreliable network route if said response indicates that a QoS of said unreliable network is sufficient for routing said telephone call.
2. The telephone switching apparatus according to claim 1 wherein said call manager includes a QoS monitor.
3. The telephone switching apparatus according to claim 2 wherein said QoS monitor is configured to compare a QoS of said unreliable network with a QoS requirement; and
    said QoS monitor is configured to communicate an acknowledgment indicating that said QoS of said unreliable network is sufficient for routing said telephone call, to said routing engine if said comparison yields a predetermined result.
4. The telephone switching apparatus according to claim 2 wherein:
    said call monitor is configured to compare a QoS received from said QoS monitor with a QoS received from said routing engine; and
    said call monitor is configured to communicate an acknowledgment indicating that said QoS of said unreliable network is sufficient for routing said telephone call, to said routing engine if said comparison yields a predetermined result.
5. The telephone switching apparatus according to claim 4 wherein:
    said call monitor is configured to communicate a negative acknowledgment to said routing engine if said comparison does not yield said predetermined result;
    wherein said routing engine is configured to route said call over an alternate network route if said response indicates that said QoS of said unreliable network is insufficient for routing said telephone call.
6. The telephone switching apparatus according to claim 1 further comprising:
    a timer; wherein if a predetermined period of time elapses on said timer said routing engine is configured to select an alternate route for said telephone call.
7. The telephone switching apparatus according to claim 1 wherein said routing engine is configured to select an alternate route for said telephone call if said response is a negative acknowledgment.
8. The telephone switching apparatus according to claim 1 further comprising:
    a comparer;
    wherein said response includes a quality of service of said unreliable network route;
    wherein said comparer is configured to compare said quality of service received in said response with a quality of service requirement of said telephone call; and
    wherein said routing engine is configured to route said telephone call over an alternate network if said comparison yields a predetermined result.
9. The telephone switching apparatus according to claim 1 further comprising:
    a comparer;
    wherein said response includes a quality of service of said unreliable network route;
    wherein said comparer is configured to compare said quality of service received in said response with a quality of service requirement of said telephone call; and
    wherein said routing engine is configured to route said telephone call over said unreliable network route if said comparison yields a predetermined result.
10. A method of routing telephone calls comprising:
    a routing engine receiving a telephone call including a destination code;
    said routing engine determining a route for said telephone call; said route comprising an unreliable network;
    said routing engine sending a message for receipt by a call manager associated with said unreliable network; said message including said destination code; and
    said routing engine routing said telephone call over said unreliable network if said routing engine receives an acknowledgment to said message.
11. The method of routing telephone calls according to claim 10 wherein said unreliable network comprises the Internet.
12. The method of routing telephone calls according to claim 10 wherein said message further includes a quality of service requirement of said telephone call.
13. The method of routing telephone calls according to claim 10 further comprising setting a timer upon sending said message, wherein if a predetermined period of time elapses on said timer said routing engine selects an alternate route for said telephone call.
14. The method of routing telephone calls according to claim 12 further comprising:
    said call manager receiving said message and forwarding said message to a quality of service monitor;
    wherein said quality of service monitor monitors said unreliable network and provides a quality of service of said unreliable network to said call manager; and
    said call manager receiving said quality of service from said quality of service monitor and comparing it to said quality of service requirement;
    wherein if said comparison yields a predetermined result said call monitor communicates an acknowledgment to said routing engine.
15. The method of routing telephone calls according to claim 14 wherein if said comparison yields a result other than said predetermined result said call monitor communicates a negative acknowledgment to said routing engine.
16. The method of routing telephone calls according to claim 10 further comprising:
    said call manager receiving said message and forwarding said message to a quality of service monitor;
    wherein said quality of service monitor monitors said unreliable network and provides a quality of service of said unreliable network to said call manager;
    said call manager receiving said quality of service from said quality of service monitor and forwarding the quality of service to said routing engine; and, said routing engine receiving said quality of service from said call manager and comparing it to a quality of service requirement of said telephone call;

wherein if said comparison yields a predetermined result said routing engine selects an alternate route for said telephone call.

17. The method of routing telephone calls according to claim 16 wherein if said comparison yields a result other than said predetermined result said routing engine routes said telephone call over said unreliable network.

18. A telephone call switching apparatus comprising:

receiving means for receiving a telephone call from a terminal, said telephone call including a destination code;

means for determining a route for said telephone call coupled to said means for receiving; said route comprising a unreliable network; and means for determining if a quality of service of said unreliable network is sufficient for routing said telephone call over said unreliable network;

wherein said means for determining a route routes said telephone call over said unreliable network if said means for determining if a quality of service is sufficient determines that said quality of service is sufficient and communicates this determination to said means for determining a route.

19. The telephone call switching apparatus according to claim 18 wherein said means for determining a route routes said telephone call over an alternate network if said means for determining if a quality of service is sufficient determines that said quality of service is not sufficient.

20. The telephone call switching apparatus according to claim 19 wherein said means for determining if a quality of service is sufficient comprises a timer.

* * * * *